(12) United States Patent
Yoaz et al.

(10) Patent No.: US 6,697,932 B1
(45) Date of Patent: Feb. 24, 2004

(54) SYSTEM AND METHOD FOR EARLY RESOLUTION OF LOW CONFIDENCE BRANCHES AND SAFE DATA CACHE ACCESSES

(75) Inventors: Adi Yoaz, Austin, TX (US); Mattan Erez, Haifa (IL); Ronny Ronen, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/475,645

(22) Filed: Dec. 30, 1999

(51) Int. Cl.⁷ .................................................. G06F 9/38
(52) U.S. Cl. ........................ 712/216; 712/217; 712/239
(58) Field of Search ................................. 712/216, 217, 712/239

(56) References Cited

U.S. PATENT DOCUMENTS

| | | | |
|---|---|---|---|
| 5,627,983 A | * 5/1997 | Popescu et al. | 712/217 |
| 5,710,902 A | 1/1998 | Sheaffer et al. | 712/216 |
| 5,854,934 A | * 12/1998 | Hsu et al. | 717/161 |
| 6,260,138 B1 | * 7/2001 | Harris | 712/239 |

OTHER PUBLICATIONS

Alexandre Farcy, Olivier Temam, Roger Espasa and Toni Juan.; Dataflow Analysis of Branch Mispredictions and Its Application to Early Resolution of Branch Outcomes; To appear in the 31st International Symposium on Microarchitecture 31, Dallas, Texas, Dec. 1998.

Erik Jacobsen, Eric Rotenberg and J. E. Smith; Assigning Confidence to Conditional Branch Predictions; 1996 IEEE, Proceedings of the 29th Annual International symposium on Microarchitecture 29, Dec. 2–4, 1996, Paris, France.

Adi Yoaz, Mattan Erez, Ronny Ronen and Stephan Jourdan; Speculation Techniques for Improving Load Related Instruction Scheduling; International Symposium on Computer Architecture–26; May 1999.

* cited by examiner

Primary Examiner—Kenneth S. Kim
(74) Attorney, Agent, or Firm—Kenyon & Kenyon

(57) ABSTRACT

The present invention is directed to a computer system and method for early resolution of a set of critical instructions. The computer system may include a scoreboard, a scheduling window and a confidence predictor. The scoreboard may include a set of reservation stations. Each one of the set of reservation stations may correspond to one of a set of decoded instructions. Each one of the set of reservation stations may have a priority field. The scheduling window may maintain the scoreboard, wherein if one of the set of decoded instructions is one of the set of critical instructions, the scheduling window may mark the priority field corresponding to the particular one of the set of decoded instructions and also may find and mark the priority field of each of a set of base instructions upon which the particular one of the set of decoded instructions depends. The confidence predictor may also be used to predict whether one of the set of decoded instructions is one of the set of critical instructions.

26 Claims, 7 Drawing Sheets

| Entry Valid | Op-code | Src1 data | Src1 valid | Src1 phys | Src2 data | Src2 valid | Src2 phys | Dst1 phys | Pri-ority | | |
|---|---|---|---|---|---|---|---|---|---|---|---|
| 1 | | | | R31 | | | | R1 | 0 | | |
| 1 | | | | R30 | | | | R2 | 1 | | |
| 1 | | | | R1 | | | | R3 | 0 | | |
| 1 | | | | R2 | | | | R4 | 0 | | |
| 1 | | | | R1 | | | R3 | R5 | 0 | | |
| 1 | | | | R3 | | | R4 | R6 | 0 | | |
| 1 | | | | R30 | | | | R7 | 1 | | |
| 1 | | | | R2 | | | R7 | R8 | 1 | | |
| 1 | | | | R29 | | | R6 | R9 | 0 | | |
| 1 | | | | R9 | | | R8 | R10 | 0 | | |
| 1 | Low Conf. Branch | | | R8 | | | | | 1 | | |
| 1 | | | | R28 | | | | R11 | 0 | | |
| 1 | | | | R11 | | | R10 | R12 | 0 | | |
| 1 | | | | R12 | | | | | 0 | | |

FIG. 2a

| Entry Valid | Op-code | Src1 data | Src1 valid | Src1 phys | Src2 data | Src2 valid | Src2 phys | Dst1 phys | Pri-ority | Dependency List |
|---|---|---|---|---|---|---|---|---|---|---|
| 1 | | | | R31 | | | | R1 | 0 | |
| 1 | | | | R30 | | | | R2 | 1 | |
| 1 | | | | R1 | | | | R3 | 0 | 1 |
| 1 | | | | R2 | | | | R4 | 0 | 2 |
| 1 | | | | R1 | | | R3 | R5 | 0 | 13 |
| 1 | | | | R3 | | | R4 | R6 | 0 | 3412 |
| 1 | | | | R30 | | | | R7 | 1 | |
| 1 | | | | R2 | | | R7 | R8 | 1 | 27 |
| 1 | | | | R29 | | | R6 | R9 | 0 | 63412 |
| 1 | | | | R9 | | | R8 | R10 | 0 | 98623741 |
| 1 | Low Conf. Branch | | | R8 | | | | | 1 | 827 |
| 1 | | | | R28 | | | | R11 | 0 | |
| 1 | | | | R11 | | | R10 | R12 | 0 | CA98623741 |
| 1 | | | | R12 | | | | | 0 | DCA98623741 |

FIG. 2b

| Entry Valid | Op-code | Src1 data | Src1 valid | Src1 phys | Src2 data | Src2 valid | Src2 phys | Dst1 phys | Pri-ority | Dependency List | Com-plete |
|---|---|---|---|---|---|---|---|---|---|---|---|
| 1 | | | | R31 | | | | R1 | 0 | | 1 |
| 1 | | | | R30 | | | | R2 | 1 | | 1 |
| 1 | | | | R1 | | | | R3 | 0 | 1 | 1 |
| 1 | | | | R2 | | | | R4 | 0 | 2 | 1 |
| 1 | | | | R1 | | | R3 | R5 | 0 | 13 | 1 |
| 1 | | | | R3 | | | R4 | R6 | 0 | 3412 | 1 |
| 1 | | | | R30 | | | | R7 | 1 | | 1 |
| 1 | | | | R2 | | | R7 | R8 | 1 | 27 | 1 |
| 1 | | | | R29 | | | R6 | R9 | 0 | 63412 | 1 |
| 1 | | | | R9 | | | R8 | R10 | 0 | 98623741 | 1 |
| 1 | Low Conf. Branch | | | R8 | | | | | 1 | 827 | 1 |
| 1 | | | | R28 | | | | R11 | 0 | | 1 |
| 1 | | | | R11 | | | R10 | R12 | 0 | CA98623741 | 0 |
| 1 | | | | R12 | | | | | 0 | DCA98623741 | 0 |

FIG. 2c

| Tag | Entry Valid | Op-code | Src1 data | Src1 valid | Src1 phys | Src2 data | Src2 valid | Src2 phys | Dst1 phys | Pri-ority | Dependency List | Com-plete |
|---|---|---|---|---|---|---|---|---|---|---|---|---|
| 1 | 1 | | | | R31 | | | | R1 | 0 | | 1 |
| 2 | 1 | | | | R30 | | | | R2 | 1 | | 1 |
| 3 | 1 | | | | R1 | | | | R3 | 0 | 1 | 1 |
| 4 | 1 | | | | R2 | | | | R4 | 0 | 2 | 1 |
| 5 | 1 | | | | R1 | | | R3 | R5 | 0 | 13 | 1 |
| 6 | 1 | | | | R3 | | | R4 | R6 | 0 | 3412 | 1 |
| 7 | 1 | | | | R30 | | | | R7 | 1 | | 1 |
| 8 | 1 | | | | R2 | | | R7 | R8 | 1 | 27 | 1 |
| 9 | 1 | | | | R29 | | | R6 | R9 | 0 | 63412 | 1 |
| A | 1 | | | | R9 | | | R8 | R10 | 0 | 98623741 | 1 |
| B | 1 | Low Conf. Branch | | | R8 | | | | | 1 | 827 | 1 |
| C | 1 | | | | R28 | | | | R11 | 0 | | 1 |
| D | 1 | | | | R11 | | | R10 | R12 | 0 | CA98623741 | 0 |
| E | 1 | | | | R12 | | | | | 0 | DCA98623741 | 0 |

FIG. 2d

SYSTEM AND METHOD FOR EARLY RESOLUTION OF LOW CONFIDENCE BRANCHES AND SAFE DATA CACHE ACCESSES

BACKGROUND OF THE INVENTION

I. Field of the Invention

This invention relates generally to computer technology, and more particularly, to improving processor performance in a computer system.

II. Background Information

Improving processor performance is a major concern in the field of computer systems. Since the primary function of many general-purpose computers is to execute a program which includes a sequence of instructions, a computer characterized as operating with improved performance completes a given program faster than the standard computer.

Piplines are employed to increase processor performance. In pipelined processors, execution of instructions is broken down into separate pipeline stages. Although the pipeline may be divided into any number of stages at which portions of instruction processing is performed, instruction processing generally comprises fetching the instruction, decoding the instruction, executing the instruction, and storing the execution results in the destination identified by the instruction. Different aspects of different instructions are processed at the same time by different stages forming the pipeline. For example, while one instruction is being fetched from memory, another is being decoded, another is being executed, etc.

A branch instruction is an instruction which typically causes subsequent instructions to be fetched from one of at least two addresses: a sequential address identifying an instruction stream beginning with instructions which directly follow the branch instruction; and a target address identifying an instruction stream beginning at another location in memory. When it is known whether or not an instruction being processed in the pipeline will cause a branch, and to what address the instruction will cause a branch (the "branch target"), the branch is resolved. Branch instructions typically are not resolved until after the execution stage.

Waiting for the branch instruction to be resolved would cause many of the pipeline stages to be idle and severely impact performance because it is unknown which instructions to load into the pipeline until after the branch is resolved. In order to maintain optimum performance of the processor, it is necessary to predict the instruction subsequent in program order to the control-flow instruction (branch) and dispatch that instruction into the instruction processing pipeline. A branch prediction mechanism indicates a predicted target for a branch instruction, allowing subsequent instruction fetching to continue within the predicted instruction stream indicated by the branch prediction.

When a branch is resolved, if the fetch unit has not fetched from the correct instruction stream (i.e., a branch misprediction occurred), the instructions fetched and placed in the pipeline subsequent to that branch instruction must be flushed, i.e., removed from the pipeline and the correct instructions must be fetched and executed. Branch mispredictions should be avoided because of the resulting pipeline flush and refetching of instructions which significantly decreases processor performance.

Another way to improve processor performance is to employ cache memory. Cache memory is a relatively high speed, relatively small memory in which active portions of program instructions and/or data are placed. The cache memory is typically much faster than main memory and approaches the speed of the processor. By keeping the most frequently accessed instructions and/or data in the high speed cache memory, the average memory access time approaches the access time of the cache.

When the processor needs a new instruction and/or data, it first looks in the cache. If the instruction and/or data is in the cache (referred to as a "cache hit"), the processor can obtain the instruction and/or data quickly and proceed with the computation. If the instruction and/or data is not in the cache (referred to as a "cache miss"), the processor must wait for the instruction and/or data to be loaded from the slower main memory. Thus a cache miss leads to a substantial reduction in processor performance.

Some processors execute ready instructions in the instruction stream ahead of earlier instructions that are not ready (these processors are referred to as out-of-order execution processors). A ready instruction is an instruction whose source data is already available. In computer systems implementing out-of-order execution, identifying the instructions that a particular instruction depends upon is necessary because the instructions dependent upon must be executed before the particular instruction in order to maintain correctness.

Dependency tracking and marking mechanisms are known in the art and exist for the purpose of identifying instructions that produce results needed for the execution of a specific instruction that follows.

Out-of-order implementations require the use of instruction scheduling. Instruction scheduling allows the processor to bypass hazards such as instruction dependencies. Instruction scheduling is a run-time technique that rearranges the execution order and functional resource allocation of the instructions from a computer program so the instructions execute in the fastest and most efficient order possible. While the rearranged stream of instructions is semantically equivalent to the original stream, the instruction scheduler arranges and overlaps the execution of instructions so as to reduce overall execution time. Current scheduling techniques usually choose instructions for execution based on a simple criteria such as original order and latency.

These scheduling policies are not optimized in the sense that they do not maximize processor performance by advancing branches that are likely to mispredict or memory accesses that are likely to miss the cache.

For the foregoing reasons, there is a need to perform early resolution of low confidence branches and cache accesses.

SUMMARY OF THE INVENTION

The present invention is directed to a computer system and method for early resolution of an instruction which is a critical instruction. An embodiment of the present invention includes a scoreboard which has one or more reservation stations where each one of the reservation stations corresponding to one of the decoded instructions and each one of the reservation stations has a priority field.

BRIEF DESCRIPTION OF THE DRAWINGS

FIG. 2a shows a scoreboard used for record keeping in an embodiment of the present invention.

FIG. 2b shows the scoreboard used for record keeping in a second embodiment of the present invention.

FIG. 2c shows the scoreboard used for record keeping in a third embodiment of the present invention.

FIG. 2d shows the scoreboard used for record keeping in a fourth embodiment of the present invention.

DETAILED DESCRIPTION

I. Overview

Figure 1:
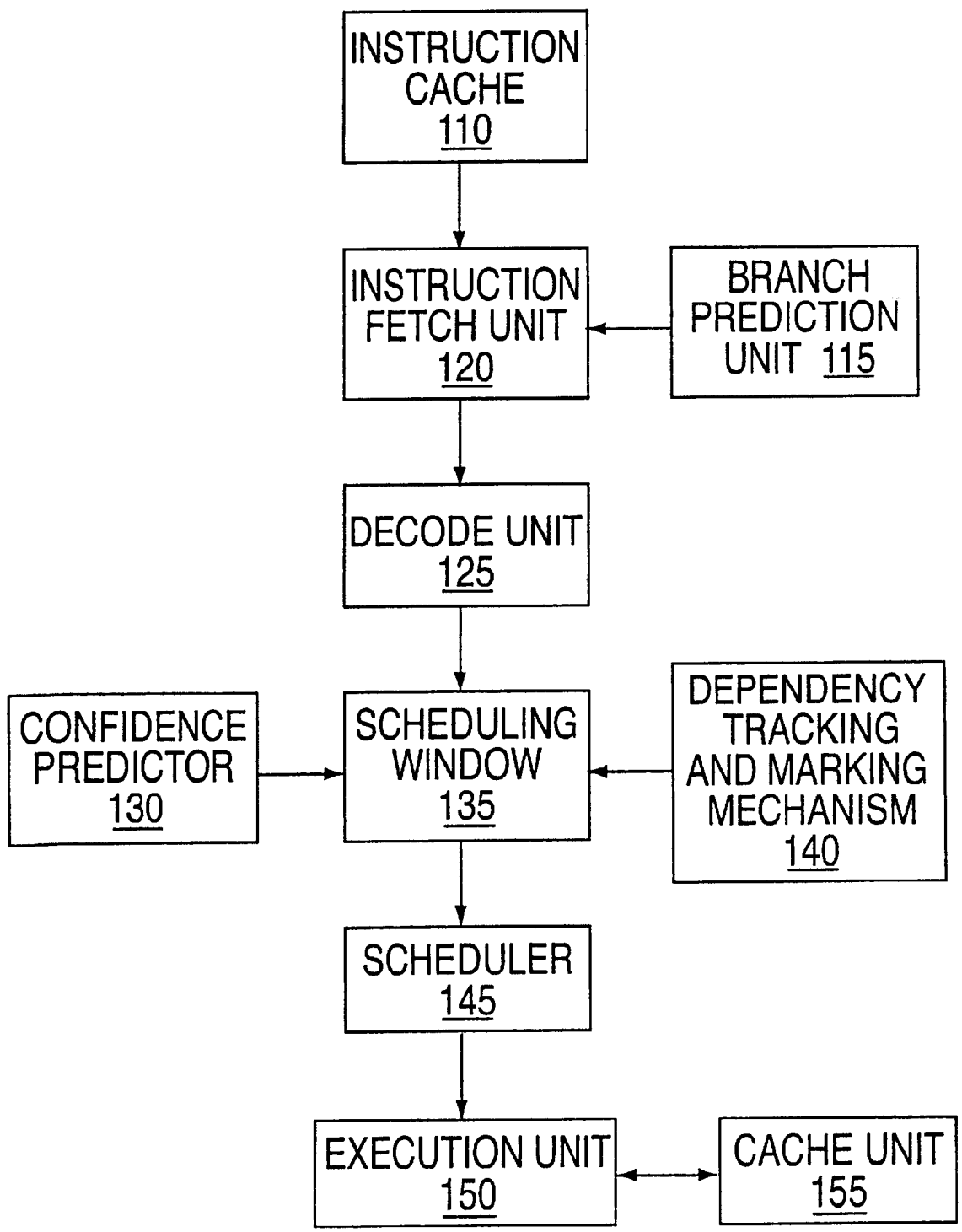
FIG. 1 is a block diagram illustrating a processor according to an embodiment of the present invention.

The present invention pertains to a hardware mechanism that reduces the impact of branch mispredictions and cache misses on processor performance. This is done by resolving critical conditional branches or executing specific critical memory accesses earlier than normal by giving higher execution priority to those instructions and the instructions they are dependent upon. The term "base instructions", as used herein, refers to the instructions upon which a particular instruction depends. Critical conditional branches are defined herein as conditional branch instructions that are mispredicted. Critical memory accesses are defined herein as memory accesses that are cache misses.

For such a method to be effective, only a limited number of branches/memory accesses should be treated. Only branches that actually are mispredicted will benefit from early resolution. Similarly, only memory accesses that actually result in a cache miss will benefit from early resolution—advancing a memory access, which turns out to be a cache hit, has limited processor performance advantage. Also, if all conditional branches and memory accesses are prioritized (in contrast to this invention which only prioritizes only critical conditional branches and memory accesses), then processor performance would not be enhanced because nearly all instructions will receive the higher execution priority.

This invention gives higher priority (so they are executed earlier and thus shorten the stall time) to instructions that are likely to cause stalls: branch mispredictions and cache misses. Identifying and assigning higher priority to instructions leading to resolution of a branch misprediction or to memory accesses that will miss the cache reduces the stall time of the processor caused by pipeline flushes and accesses to the slower main memory respectively.

Pipeline flushes and stalls are a major limitation to processor performance. Most flushes to the processor pipeline occur when a branch is resolved and a misprediction is detected. During the time between a branch misprediction and its resolution, the processor wastes resources working on instructions fetched from the wrong path. This invention minimizes the time wasted performing this "non useful" work. This is done by resolving branch instructions that are relatively likely to be mispredicted earlier than in usual execution. By resolving branch mispredictions earlier, fewer instructions from the wrong path are fetched and processed.

Similarly many pipeline stalls are associated with data cache misses. Particularly, if the data required by a load is not present in the cache, a high latency is incurred and the pipeline may stall (partially or fully). This invention minimizes the stall time caused by waiting for missing data. This is done by executing instructions that are likely to cause a cache miss earlier. In this way, the cache miss latency is hidden (i.e., a later instruction is not waiting for the data value to be fetched from the slower main memory because that data has already been inserted into the cache) resulting in processor performance as if the data was prefetched.

Some of the advantages of this invention include:

(1) Using a confidence predictor for early resolution of the significant subset of branches that have a high probability of being mispredicted and can benefit most from early resolution. In this way the effectiveness of the mechanism is greatly increased, since not all instructions receive a high priority and resolution of critical branches is expedited.

(2) Extending early resolution, as a method of reducing processor stall times, to cache misses by using a cache hit-miss predictor. Accesses that miss the cache cause pipeline stalls but these pipeline stalls can be eliminated or reduced by earlier execution of the instruction producing the cache miss.

(3) A dependency tracking mechanism for an out-of-order scheduling window which lists the set of instructions upon which a particular instruction depends.

II. Hardware Involved in Early Resolution of Low Confidence Branches and Data Cache Accesses Referring to the figures in which like numerals indicate like elements, FIG. 1 is a block diagram illustrating the hardware used in an embodiment of the present invention. A processor 10 shown in FIG. 1 includes an instruction cache 110, a branch prediction unit 115, an instruction fetch unit 120, a decode unit 125, a confidence predictor 130, a scheduling window 135, a dependency tracking and marking mechanism 140, a scheduler 145, an execution unit 150, and a cache unit 155.

Instruction cache 110 is a high-speed cache memory for storing instructions which are fetched from main memory. Instruction cache 110 stores commonly or recently accessed blocks of data. The cache may be structured in any suitable manner, including set associative or direct mapped structures.

Branch prediction unit 115, in general, generates branch predictions for the branch instructions, directs instruction fetch unit 120 to retrieve the program instructions in an order corresponding to the branch predictions, and redirects instruction fetch unit 120 based on a branch misprediction. If a branch prediction was incorrect, the instructions subsequent to the mispredicted branch that have entered the instruction processing pipeline are flushed, and the correct instructions are fetched from instruction cache 110. In such situations, results of instructions in the original program sequence which occur after the mispredicted branch instruction are discarded.

Instruction fetch unit 120 retrieves program instructions. The program instructions fetched include branch and load instructions. Which program instruction is retrieved is determined by whether a control flow instruction such as a branch is involved. If the branch instruction is not involved then instructions are fetched sequentially from instruction cache 110. However, a branch instruction (or a prediction that a branch will occur) causes instructions to be fetched in a non-sequential manner with branch prediction unit 115 providing the next instruction to be fetched.

Decode unit 125 decodes each instruction fetched from instruction fetch unit 120. Decode unit 125 receives the instruction encoding value from instruction fetch unit 120, and prepares the instruction encoding value by translating the instruction encoding value into a format which can be executed. Once the instruction has been decoded into a usable format, the decoded instruction is sent to scheduling window 135. The decoded format may consist of one or more micro-instructions.

Scheduling window 135 uses confidence predictor 130 to find critical instructions, i.e., instructions that are likely to result in a branch misprediction or a cache miss. Confidence predictor 130 may include a branch prediction confidence mechanism which assesses the likelihood that a conditional branch prediction is correct. This mechanism is used in order to minimize the penalty for a branch misprediction where there is a high likelihood of a branch misprediction. Branch prediction, confidence mechanisms are explained in: Erik Jacobsen, Eric Rotenberg, and J. E. Smith, Assigning Confidence to Conditional Branch Predictions, MICRO-29, December, 1996. If the branch prediction confidence mechanism predicts a low likelihood that the branch prediction is correct then that branch instruction can be given a high priority so that it (and all the instructions on which it depends) is executed earlier and thus minimizes the amount of resources wasted working on instructions fetched from the wrong path.

Confidence predictor 130 may also include a cache hit-miss predictor which predicts the likelihood that a cache miss will occur. This mechanism is used in order to minimize the penalty for a cache miss where there is a high likelihood that a miss will occur. Data cache hit-miss predictors are explained in: Adi Yoaz, Mattan Erez, Ronny Ronen, and Stephan Jourdan, Speculation Techniques for Improving Load Related Instruction Scheduling, ISCA'26, May, 1999. If there is a high likelihood that an instruction will cause a cache miss then that instruction (and all the instructions on which it depends) is given a high priority so that it will execute earlier and thus bring the data into the cache for later instructions to use (the result is similar to that of prefetching data into the cache).

Scheduling window 135 creates and maintains the scoreboard shown in FIGS. 2a–2d and which is described in detail in the next section. For each instruction, a reservation station is created in the scoreboard. Each reservation station includes a priority field which indicates whether that instruction should be executed before other instructions with a lower priority. Scheduling window 135 sets the priority field to "1" of a critical instruction and those instructions on which the critical instruction depends. The term "marks", as used herein, refers to setting the priority field of the corresponding reservation station to "1". The instructions on which the critical instruction depends are those instructions whose destination registers match the source registers of the critical instruction and all other destination registers which match the source registers of the previous instruction in this chain.

The instructions dependent upon are found by traversing and marking the instructions whose destination registers match the critical instruction's source registers and then finding and marking the next set of instructions whose destination registers match the source registers of the first set of destination registers and continuing in this manner until the source registers for an instruction are not in the scoreboard. For example, referring to FIG. 2d, the instructions dependent upon for the low confidence branch (instruction B) are the following instructions: 8, 2, and 7. These instructions dependent upon are found by first, determining which instructions have as destination registers the source registers of instruction B. Here, the source register (R8) is a destination register for instruction 8. Instruction 8 has as source registers R2 and R7. R2 is the destination register for instruction 2. Instruction 2 has as a source register R30 which is not in the scoreboard and thus there are no other dependent instructions in this direction. R7 is the destination register for instruction 7. Instruction 7 has as a source register R30 which is not in the scoreboard and thus there are no other dependent instructions in this direction.

In an alternative embodiment involving an out-of-order scoreboard, scheduling window 135 uses dependency tracking and marking mechanism 140 in order to create a dependency list for the instruction. The dependency list contains pointers to all the instructions to which the particular instruction is dependent. For each new instruction, its dependency list is created by adding the source instructions to its dependency list and then merging the dependency lists of the source instructions. For example, referring to FIG. 2d, the dependency list for instruction B is found by first adding its source instructions (instructions 8) and then merging the dependency list of this source instructions. Instruction 8 has a dependency list which contains instructions 2 and 7. Merging the source instructions and the dependency list of the source instruction results in instruction B having the following dependency list: 8, 2, and 7.

In another alternative embodiment involving an out-of-order scoreboard, scheduling window 135, in order to reduce the amount of memory space required to maintain the dependency list keeps only a partial dependency list (rather than keeping a dependency list containing all the instructions on which the particular instruction depends) and a "complete" field is added to each entry in the scoreboard. Because only a partial dependency list is kept in the scoreboard, a recursive method is used to find the remaining instructions which the particular instruction depends. An example of finding the dependency list using a recursive method is provided in the next section.

In another alternative embodiment involving an in-order scoreboard, a dependency list as described in U.S. Pat. No. 5,710,902 is used to identify the instructions on which the critical instruction depends. In the in-order scoreboard, the entries are stored sequentially in the scoreboard because the instructions are fetched sequentially. In this embodiment, each instruction in the in-order scoreboard has a dependency list. The dependency list is implemented using a bit array and each line of the bit array represents one of the instructions in the ordered sequence of instructions within the instruction window. When a new instruction is processed, its dependency list is formed by merging the dependency lists of its two source instructions. This merging can be achieved by OR-ing the lines of the bit array corresponding to the source instructions.

Scheduler 145 schedules instructions based on instruction dependencies and available system resources. In one embodiment, scheduler 145 searches scheduling window 135 for a ready to execute instruction using a modified scheduling algorithm. Instead of dispatching the oldest ready instruction, a parallel search is also made to check whether a ready instruction exists which has its priority field set. Under this algorithm, scheduler 145 sends to execution unit 150 the oldest instruction having its priority field set but if none of the instructions has its priority field set then the oldest instruction is sent to execution unit 150. When scheduler 145 sends an instruction to execution unit 150, that instruction is removed from the scoreboard.

Execution unit 150 executes logical and arithmetic instructions as well as other well known execution functions. Execution unit 150 may be capable of performing both integer and floating point instructions. A cache unit 155 is attached to execution unit 150. Cache unit 155 is very fast memory in which frequently used data values are duplicated for quick access. Execution unit 150 accesses cache unit 155 in order to read or write a data value. If the data value is not found in cache unit 155 then processor 10 must access the slower main memory.

III. The Scoreboard Which Performs the Record Keeping Involved in Early Resolution of Low Confidence Branches and Data Cache Accesses FIG. 2a shows the scoreboard which is used for record keeping in one embodiment of the present invention. Each instruction has a corresponding reservation station ("RS") in the scoreboard. The scoreboard keeps track of all the source and destination registers of each instruction. A source register, as defined herein, is a register containing a value operated upon by a processor in response to an instruction to produce a result. The result is stored in a destination register specified by the instruction. Hence, a source register has its contents read, whereas, data is written into the destination register.

The "entry valid" field of FIG. 2a tells whether the instruction corresponding to the RS entry is valid. The "op-code" field specifies the instruction corresponding to that RS entry. The "src1 data" field is the data found in the first source register. The "src1 valid" field indicates whether the data in the first source register is valid. The "src1 phys" field indicates the physical register where the data in the first source register is stored. The "src2 data" field is the data found in the second source register. The "src2 valid" field indicates whether the data in the second source register is valid. The "src2 phys" field indicates the physical register where the data in the second source register is stored. The "dst1 phys" field indicates the physical register where the data in the destination register is stored.

The "priority field" is a one bit field which is added to each entry in the scheduling window (i.e., to each RS entry). A critical instruction and the instructions on which the critical instruction depends have the priority field set to "1" to indicate that it should be executed earlier than instructions which are not critical (i.e., the non-critical instructions have their priority field set to "0"). Scheduler 145 dispatches to execution unit 150 the oldest instruction with its priority field set to "1" but if none of the instructions have their priority field set to "1" then the oldest instruction is dispatched to execution unit 150.

FIG. 2b shows an alternative embodiment of the scoreboard. In this embodiment, a "dependency list" field is added to the scoreboard. The dependency list field stores pointers to the instructions on which it is dependent. For each new instruction, this field is updated by adding its source instructions to the dependency list and also merging the source instructions' dependency lists. The merging of dependency lists may be done in various ways; one way to merge is to interleave the dependency lists of the source instructions.

Merging of dependency lists using an interleaved manner is shown in the following example. In FIG. 2b and FIG. 2c, the numbers in parentheses in the left-most column of the scoreboard are used for reference purposes and do not constitute the tag field which will be discussed in FIG. 2d. Referring to FIG. 2b, to find the dependency list for instruction (A) using interleaved merging, the source instructions for instruction (A), which are instructions (9) and (8), are put in the dependency list for instruction (A). Then, the dependency list for instructions (9) and (8) are merged in an interleaved manner. Instruction (9), has in its dependency list the following instructions: 6, 3, 4, 1, and 2. Instruction (8), has in its dependency list the following instructions: 2 and 7. Merging in an interleaved manner means that an instruction from one dependency list is inserted into the dependency list of instruction (A) and then an instruction from the other dependency list is inserted into the dependency list of instruction (A) and continuing in this manner until all instructions in the dependency lists of the source instructions are exhausted (usually, only two dependency lists are merged). Merging in an interleaved manner results in instruction (A) having the following dependency list: 9,8,6,2,3,7,4, and 1.

FIG. 2c shows another alternative embodiment where only a partial dependency list is maintained and a "complete" field is added. Keeping only a partial list of instructions and including a complete field to the scoreboard reduces the amount of memory space required to maintain a dependency list in those cases where the dependency list contains a large number of instructions. This partial list includes the source instructions and as many instructions as possible from the source dependency lists. In the embodiment shown in FIG. 2c, the dependency list stores up to eight instructions. However, this invention is not limited to a dependency list of eight instructions; the dependency list may be of any length. To create the dependency list for a particular instruction, that instruction's source instructions are added together with the merger of the source instructions' dependency lists.

In this alternative embodiment, a "complete" field is used to indicate whether all the instructions on which the particular instruction depends are in the dependency list. If all the instructions are not in the dependency list, then the complete field is set to "0". However, if all the instructions on which the particular instruction depends are in the dependency list, then the complete field is set to "1". If the complete field is set to "1", then nothing more should be done. However, if the complete field is set to "0", then the dependencies are found recursively by starting with the source instructions for the particular instruction (usually, the first two instructions of the dependency list) and then recursively finding all the other instructions to which the critical instruction depends. By recursively finding all the dependencies, a complete dependency list is found even though the dependency list is limited (in FIG. 2c, the dependency list is limited to eight instructions) for each RS entry.

In FIG. 2c, the underlined numbers represent the instructions that are greater in number than the eight instructions allowed in the dependency list in this embodiment of the invention. The following example illustrates the steps performed for using recursion to find the complete dependency list (in these cases, the complete field is set to "0").

Referring to FIG. 2c, instruction (D) has a partial dependency list because its complete field is set to "0". The complete dependency list for this instruction can be found recursively. Instruction (D) has as source instructions the following two instructions: instruction (C) and instruction (A). Instruction (A) is a source instruction because its destination register (R10) is one of instruction (D)'s source registers. Similarly, instruction (C) is a source instruction because its destination register (R11) is one of instruction (D)'s source registers. Instruction (C) does not have any instructions in its dependency list and its complete field is set to "1" thus there is no need to pursue recursion in this direction. Instruction (A) has a dependency list with its complete field set to "1", therefore, recursion in this direction is stopped. The full dependency list for instruction (D) is the merger of its two source instructions (instructions (C) and (A)) and the dependency list of instruction (A). This results in instruction (D) having the following full dependency list as found recursively: C A 9 8 6 2 3 7 4 1.

FIG. 2d shows another alternative embodiment where a "tag" field is added to an out-of-order scoreboard in order to uniquely identify a RS entry. The tag field may be needed because the pointers to the instructions cannot be kept as an absolute position in scheduling window 135. Each tag field points to the corresponding instruction. Each tag field is unique thus allowing each instruction to be uniquely identified. If an in-order scoreboard is used then the tag field may not be needed because the entries in that scoreboard are stored sequentially and thus each entry in the scoreboard can be referred to by its absolute position in the scoreboard.

Figure 3A:
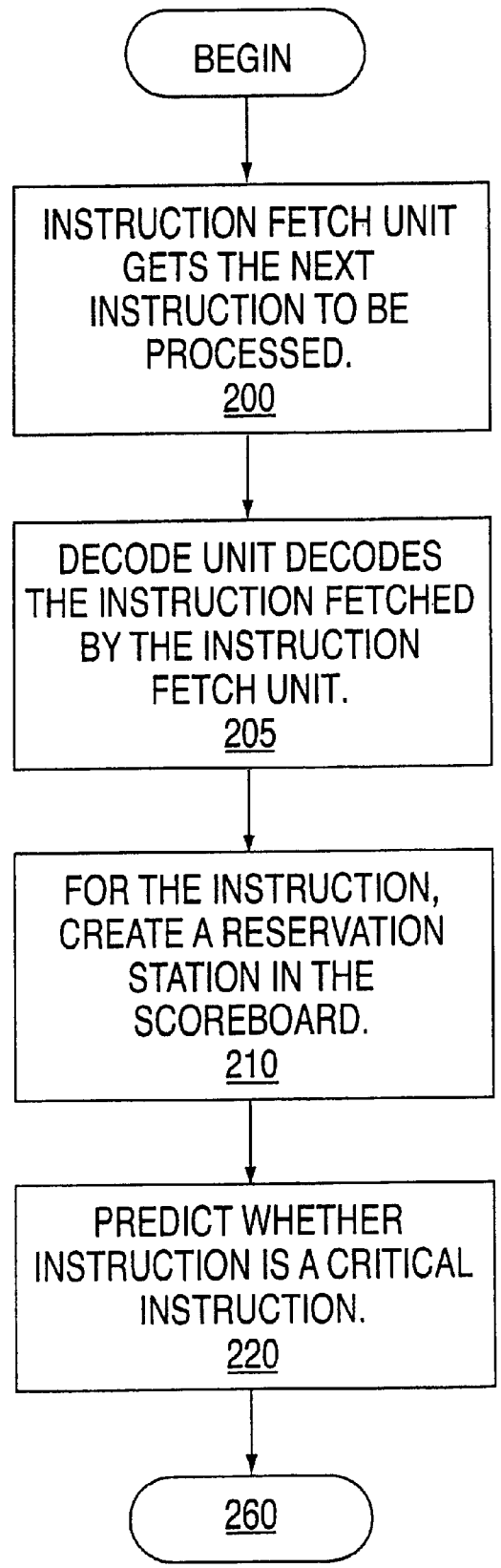
FIG 3a is a flowchart describing the sequence of steps used to implement an embodiment of the present invention.
Figure 3B:
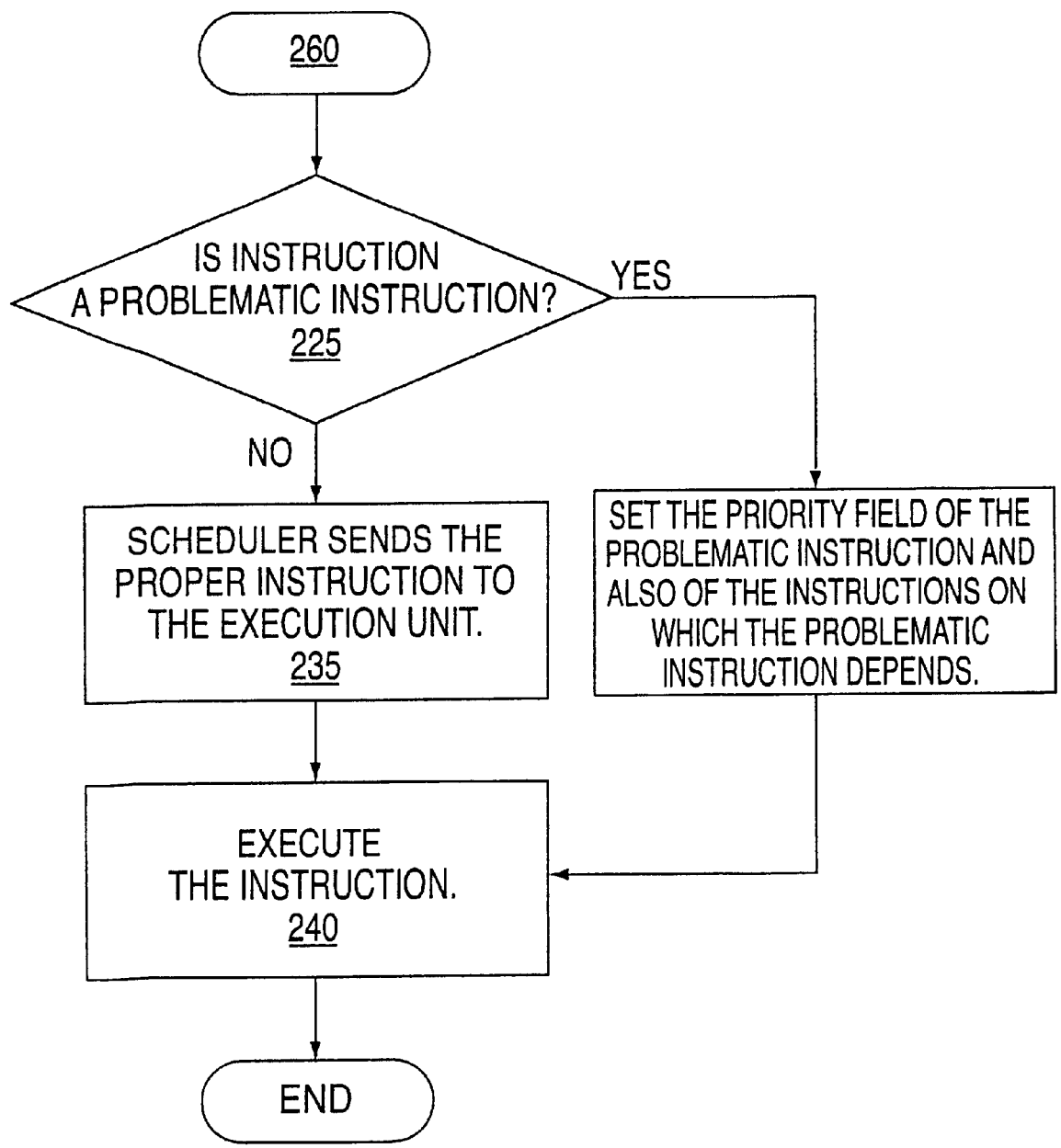
FIG. 3b is a flowchart describing the sequence of steps used to implement and embodiment of the present invention.

IV. Steps Involved in Implementing the Early Resolution of Low Confidence Branches and Data Cache Accesses FIGS. 3a and 3b is a flowchart describing the sequence of steps taken, by processor 10 in order to implement an embodiment of the present invention. In step 200, instruction fetch unit 120 gets the-next instruction to be processed. Instruction fetch unit 120 gets the next instruction from instruction cache 110. If a branch prediction has been made, then branch prediction unit 115 supplies the target address from where instruction cache 110 should get the next instruction In step 205, decode unit 125 decodes the instruction fetched by instruction fetch unit 120. In step 210, a reservation station ("RS") is created in the scoreboard for each instruction. Using the decoded instruction, scheduling window 135 fills-in the following fields of the scoreboard: entry valid, op-code, src1 data, src1 valid, src1 phys, src2 data, src2 valid, src2 phys, and dst1 phys. If the pointers to the instruction cannot be kept as an absolute position in the scoreboard (i.e., an out-of-order scoreboard is used), then scheduling window 135 adds a "tag" field. The tag field uniquely identifies the instruction in the scoreboard.

In step 220, confidence predictor 130 predicts whether an instruction is a critical instruction. Confidence predictor 130 may include a branch prediction confidence mechanism and a cache hit-miss predictor. The branch prediction confidence mechanism is used to find critical branch instructions, i.e., instructions that are likely to be branch mispredictions. The cache hit-miss predictor is used to find critical memory access instructions, i.e., instructions that are likely to be cache misses.

In step 225, processor 10 determines if the instruction is likely to be a critical instruction. If the instruction is likely to be a critical instruction then in step 230, scheduling window 135 sets the priority field to "1" of the RS entries in the scoreboard corresponding to the critical instruction and those instructions upon which the critical instruction depends. The instructions dependent upon are found by traversing and marking the instructions whose destination registers match the critical instruction's source registers and then finding and marking the next set of instructions whose destination registers match the source registers of the first set of destination registers and continuing in this manner until the source registers for an instruction are not in the scoreboard.

For example, in FIG. 2d, instruction B is predicted to be a critical instruction, i.e., a branch misprediction. Instruction B has as a source register R8 and R8 is a destination register for instruction 8. Next, the instructions whose destination register matches instruction 8's source registers are found. Instructions 2 and 8 have destination registers that match instruction 8's source registers. The destination registers for the source registers of instructions 2 and 8 are not in the scoreboard and therefore, the RS entries corresponding to the following instructions will have their priority fields set to "1": B, 8, 7, and 2.

In an alternative embodiment, using an in-order scoreboard, a dependency chain as described in U.S. Pat. No. 5,710,902 keeps track of the instructions on which the particular instruction depends. This alternative embodiment is explained in section II above.

In another alternative embodiment using an out-of-order scoreboard, a dependency list is created for each entry in the scoreboard (each entry corresponds to an instruction) using the dependency tracking and marking mechanism 140. The dependency list is maintained as a field in the scoreboard. This alternative embodiment is explained in section II above.

In another alternative embodiment, in order to reduce the amount of memory space required to maintain the dependency list, a partial dependency list is kept (rather than keeping a dependency list containing all the instructions on which the particular instruction depends) and a complete field is added to the scoreboard. This alternative embodiment is also explained in section II above.

In step 235, scheduler 145 picks the next instruction in the scoreboard that should be executed and sends this instruction to execution unit 150. When searching the scoreboard for a ready to execute instruction, scheduler 145 uses the following algorithm: Selects the oldest instruction with its priority field set to "1", but if none of the instructions have its priority field set to "1" then the oldest ready instruction is selected. In step 240, the instruction sent by scheduler 145 is executed by execution unit 150.

In step 245, once an instruction is done executing, the completed instruction is removed from the dependency lists of all instructions in the scoreboard. In an in-order scoreboard using a bit map to implement the dependency list, references to the completed instruction are removed by clearing the relevant bits on all bitmaps. In an out-of-order scoreboard, where the dependency list is implemented using pointers to the instructions upon which it is dependent, when an instruction completes, references to the completed instruction are removed by removing the pointer to the completed instruction in all the dependency lists where that particular instruction is dependent upon. In the alternative embodiment where unique tags are provided for each scoreboard entry, when an instruction is retired, its tag is removed from the scoreboard and the relevant pointers in the dependency lists become invalid.

One of skill in the art will appreciate that the present invention is useful in either reduced instruction set computers ("RISC") or complex instruction set computers ("CISC") that operate with out-of-order execution or completion. Identifying and assigning higher priority to instructions leading to resolution of a branch misprediction, or to the execution of an instruction that results in a cache miss reduces the stall time of the processor and this is effective regardless of whether the instruction set is RISC or CISC. An instruction may be broken into several micro-instructions and the rules and this invention applies to each of the micro-instructions separately.

An alternative embodiment entails using a dependency list predictor to predict the dependency lists of each instruction fetched. The dependency list predictor performs the functionality of the dependency list (i.e., there is no need for a dependency list in the scoreboard if the dependency list predictor is employed). The dependency list predictor marks at fetch time all instructions in the dependency chain upon which the critical instruction (i.e., instructions that will result in branch mispredictions or cache misses) depends.

Another alternative embodiment entails assigning different values to the priority field for a particular critical instruction and the instructions upon which the critical instruction depends, the number based on the criticality of the particular critical instruction. Scheduler 145 will then send to execution unit 150 the instruction that is the oldest and has the highest value in its priority field. For example, if a branch prediction is assessed to be a misprediction, then the priority field of that instruction and the instructions upon which it depends can have a higher value than the instructions associated with a memory access that is predicted to be a cache miss, where the cache miss will have a less significant effect on processor performance than the branch misprediction. Also, if several instructions having different priorities (e.g., assume instruction 1 has a priority of "1" and instruction 2 has a priority of "2") depend upon another instruction (e.g., instruction 3) then that other instruction will be assigned the highest priority among these instructions (i.e., instruction 3 will have a priority of "3" or higher in this example).

Although embodiments are specifically illustrated and described herein, it will be appreciated that modifications and variations of the present invention are covered by the above teachings and within the purview of the appended claims without departing from the spirit and intended scope of the invention.

What is claimed is:

1. A computer system for early resolution of a set of critical instructions, comprising:
    a scoreboard including a set of reservation stations, each one of the set of reservation stations corresponding to one of a set of decoded instructions and each one of the set of reservation stations having a priority field;
    a confidence predictor to predict whether one of the set of decoded instructions is one of the set of critical instructions; and
    a scheduling window to maintain the scoreboard where if the confidence predictor predicts that one of the set of decoded instructions is one of the set of critical instructions, then the scheduling window marks the priority field corresponding to the particular one of the set of decoded instructions and also finds and marks the priority field of each of a set of base instructions upon which the particular one of the set of decoded instructions depends.

2. The computer system of claim 1 further comprising a scheduler which dispatches from the scoreboard an instruction that has its priority field marked, is the oldest, and is ready to execute, but if the scoreboard does not include one or more instructions whose priority field is marked, then the scheduler dispatches an instruction that is the oldest and is ready to execute.

3. The computer system of claim 1 wherein the scoreboard is an in-order scoreboard and the set of base instructions for a particular one of the set of decoded instructions is found by ORing a set of lines of a bit array corresponding to a set of source instructions for the particular one of the set of decoded instructions.

4. The computer system of claim 1 wherein the scoreboard is an out-of-order scoreboard and includes a set of dependency lists, one for each of the set of reservation stations, each of the set of dependency lists includes the set of base instructions for that particular one of the set of decoded instructions.

5. The computer system of claim 4 wherein a dependency tracking and marking mechanism is used in an out-of-order scoreboard to find the set of base instructions in each of the set of dependency lists upon which a corresponding one of the set of decoded instructions depends.

6. The computer system of claim 5 wherein for one of the set of decoded instructions, the scheduling window finds the set of base instructions for the particular one of the set of decoded instructions by merging together a set of source instructions of the particular one of the set of decoded instructions, and the set of base instructions corresponding to each of the set of source instructions.

7. The computer system of claim 1 wherein a dependency tracking and marking mechanism is used in an out-of-order scoreboard to find and store all or fewer than all of the set of base instructions on which a corresponding one of the set of decoded instructions depends.

8. The computer system of claim 7 wherein the out-of-order scoreboard includes a set of complete fields, one for each of the set of reservation stations, and each of the set of complete fields indicates whether the corresponding dependency list includes at least one of all of the set of base instructions or fewer than all of the set of base instructions.

9. The computer system of claim 8 wherein the complete field is set to complete to indicate that the corresponding dependency list includes all of the set of base instructions, and the complete field is set to incomplete to indicate that the corresponding dependency list includes fewer than all of the set of base instructions.

10. The computer system of claim 9 wherein for one of the set of decoded instructions having its complete field set to incomplete, the scheduling window finds recursively the set of base instructions for the particular one of the set of decoded instructions by merging together a set of source instructions of the particular one of the set of decoded instructions and merging a set of source instructions whose complete filed is set to incomplete until each of the set of source instructions has its corresponding complete field set to complete and then the corresponding dependency list for each of the set of source instructions whose complete field is set to complete is merged.

11. The computer system of claim 1 wherein the scoreboard includes a set of tag fields, each one of the set of tag fields uniquely identifying each one of the set of reservation stations.

12. The computer system of claim 1 wherein the confidence predictor includes a branch prediction confidence mechanism to predict the likelihood that a branch misprediction will occur.

13. The computer system of claim 1 wherein the confidence predictor includes a cache hit-miss predictor to predict the likelihood that a cache miss will occur.

14. A scoreboard, comprising:
    a set of reservation stations, each one of the set of reservation stations corresponding to one of a set of decoded instructions and each one of the set of reservation stations having a priority field;
    a set of complete fields, each one of the set of complete fields indicating whether a corresponding one of a set of dependency list includes at least one of all of the set of base instructions or less than all of the set of base instructions upon which the corresponding one of the set of decoded instructions depends; and
    a set of dependency lists, one for each of the set of reservation stations, and each of the set of dependency lists including all or less that all of a set of base instructions upon which the corresponding one of the set of decoded instructions depends.

15. The scoreboard of claim 14 further comprising:
    a set of tag fields, each one of the set of tag fields uniquely identifying each of the set of reservation stations.

16. A method for early resolution of a set of critical instructions, comprising:

creating a scoreboard including a set of reservation stations, each one of the set of reservation stations corresponding to one of a set of decoded instructions, and each of the set of reservation stations having a priority field; and predicting whether each one of the set of decoded instructions is one of the set of critical instructions, and if one of the set of decoded instructions is predicted to be one of the set of critical instructions, marking the priority field of the particular one of the set of decoded instructions, and finding and marking the priority fields of each of a set of base instructions upon which the particular one of the set of decoded instructions depend.

17. The method of claim 16 wherein the scoreboard is an in-order scoreboard and finding the set of base instructions for a particular one of the set of decoded instructions is done by ORing a set of lines of a bit array corresponding to a set of source instructions for the particular one of the set of decoded instructions.

18. The method of claim 16 wherein the scoreboard is an out-of-order scoreboard and finding the set of base instructions upon which the particular one of the set of decoded instructions depends is performed using a dependency tracking and marking mechanism.

19. The method of claim 18 wherein the set of base instructions for the particular one of the set of decoded instructions is the merger of a set of source instructions of the particular one of the set of decoded instructions and the set of base instructions of each of the set of source instructions.

20. The method of claim 19 wherein the set of base instructions of each of the set of source instructions are merged in an interleaved manner.

21. The method of claim 18 wherein the dependency tracking and marking mechanism finds all of the set of base instructions and marks the priority field of each of the set of base instructions corresponding to the particular one of the set of decoded instructions.

22. The method of claim 18 wherein the dependency tracking and marking mechanism finds and stores less than all of the set of base instructions corresponding to the particular one of the set of decoded instructions.

23. The method of claim 22 wherein the scoreboard includes a set of complete fields, one for each of the set of reservation stations, and each of the set of complete fields indicating whether at least one of all of the set of base instructions have been found, or fewer than all of the set of base instructions have been found.

24. The method of claim 23 wherein if fewer than all of the set of base instructions have been found then a remainder of the set of base instructions is found recursively by merging together a set of source instructions of the particular one of the set of decoded instructions and merging a set of source instructions whose complete filed is set to incomplete until each of the set of source instructions has its corresponding complete field set to complete and then the corresponding dependency list for each of the set of source instructions whose complete field is set to complete is merged.

25. The method of claim 16 further comprising dispatching, using a scheduler, an instruction whose priority field is marked, is the oldest, and is ready to execute, but if the scoreboard does not include one or more instructions whose priority field is marked, then dispatching an instruction that is the oldest and is ready to execute.

26. The method of claim 16 wherein after one of the set of decoded instructions completes, that instruction is removed from the set of base instructions for each of the set of decoded instructions in the scoreboard.

* * * * *